United States Patent Office 3,808,100
Patented Apr. 30, 1974

3,808,100
FERMENTATION PROCESS FOR PRODUCING ADENOSINE CYCLIC 3',5'-PHOSPHATE
Ichiro Chibata and Jyoji Kato, Osaka, Taizo Watanabe, Kyoto, and Tomofumi Uchida, Osaka, Japan, assignors to Tanabe Seiyaku Co., Ltd., Osaka, Japan
No Drawing. Filed Feb. 9, 1973, Ser. No. 331,039
Claims priority, application Japan, Feb. 17, 1972, 47/16,764
Int. Cl. C12d 13/06
U.S. Cl. 195—28 N                                              7 Claims

ABSTRACT OF THE DISCLOSURE

Fermentation process for producing adenosine cyclic 3',5'-phosphate by inoculating a strain of the genus Sarcina selected from Sarcina lutea IAM 1099 and its purine-requiring mutant, adenosine deaminase-less mutant, or purine-requiring and adenosine deaminase-less mutant into a culture medium, cultivating the culture in the presence of a purine compound and further a keto acid or its salt until adenosine cyclic 3',5'-phosphate is accumulated in the culture broth, and recovering it from the culture broth.

---

The present invention relates to a fermentation process for producing adenosine cyclic 3',5'-phosphate (hereinafter referred to as cAMP).

It has been known that cAMP is widely distributed in various organisms and has important effect on glycometabolism. And recently, its utility as a medicine is rapidly developing.

There has, hitherto, been known some fermentation processes for producing cAMP, such as those by using microorganisms belonging to the genus Corynebacterium, Arthrobacter, Microbacterium and Brevibacterium (Japanese patent publication Nos. 42,958/1971, 33/1972, 1,838/1972 and 1,839/1972, and "Amino Acid and Nucleic Acid," vol. 10, p. 117, 1964).

It has been studied to find out more useful fermentation process for producing cAMP, and it has now been found out that cAMP can be produced and accumulated in the broth by cultivating a strain of the genus Sarcina in the presence of a purine compound and further that the amount of cAMP to be accumulated in the broth is increased by adding a keto acid or its salt to the culture medium.

An object of the present invention is to provide an improved fermentation process for producing cAMP.

Another object of the invention is to provide a fermentation process for producing cAMP by cultivating a strain of the genus Sarcina in the presence of a purine compound.

Another object of the invention is to provide a method for increasing cAMP to be accumulated by adding a keto acid or its salt to the culture medium.

These and other objects will be apparent from the description hereinafter.

The fermentation process of the present invention comprises inoculating a strain of the genus Sarcina into a culture medium containing an assimilable carbon source, a utilizable nitrogen source and others, cultivating it in the presence of a purine compound and further a keto acid or its salt until cAMP is accumulated in the culture broth and recovering the cAMP thus accumulated from the culture broth.

The cultivation of the invention can be preferably carried out in an aerobic condition, such as shaking culture or aeration-agitation culture, and at a temperature of about 10° to 40° C., at pH value of about 5 to 9.

The culture medium used in the invention may contain carbon sources (e.g. glucose, dextrin, or sucrose), nitrogen sources (e.g. yeast extract, meat extract, peptone, malt extract, fishmeal, or corn steep liquor), inorganic materials (e.g. potassium phophate, sodium phosphate, magnesium sulfate or calcium chloride), and further vitamins (e.g. pantothenic acid, thiamine, biotin, folic acid, pyridoxine, or its salt) and purine compounds (e.g. adenine, guanine, or adenosine).

A purine compound is added to the culture medium either before or preferably while the cultivation. It is usually added within a period of 48 hours after initiation of the cultivation.

The purine compound to be added to the medium may be preferably adenine, hypoxanthine or the derivative thereof (e.g. adenosine or inosine). The purine compound is preferably added in an amount of about 0.1 to 0.5% by weight.

Furthermore, it is preferable to add a keto acid or its salt to the culture medium for increasing the amount of cAMP to be accumulated in the culture broth. The keto acid or its salt may be added simultaneously or separately with a purine compound before or while the cultivation, but, preferably within a period of 48 hours after initiation of the cultivation. The keto acid or its salt may be, for example, pyruvic acid, $\alpha$-ketobutyric acid or $\alpha$-isovaleric acid, or the salt thereof with alkali metal (e.g. sodium or potassium) or alkaline earth metal (e.g. magnesium). The amount of the keto acid or its salt to be added may be in a range of about 0.5 to 3.0% by weight.

The suitable examples of the strain of the genus Sarcina may be Sarcina lutea IMA 1099 (ATCC No. 9341) and mutants thereof, such as FERM-P No. 1333 strain (ATCC No. 21880), FERM-P No. 1334 strain (ATCC No. 21882), and FERM-P No. 766 strain (ATCC No. 21881), in which FERM means Fermentation Research Institute, Agency of Industrial Science and Technology, Japan, and ATCC means American Type Culture Collection, U.S.A. The FERM-P No. 1333 strain is a purine-requiring mutant of Sarcina lutea IAM 1099, the FERM-P No. 1334 strain is an adenosine deaminase-less mutant of Sarcina lutea IAM 1099 and the FERM-P No. 766 strain is a purine-requiring and adenosine deaminase-less mutant of Sarcina lutea IAM 1099, which are obtained by treating Sarcina lutea IAM 1099 with nitrosoguanidine.

After the cultivation, the cAMP accumulated in the culture broth can be readily recovered and purified by a conventional method, such as treatment with an ion-exchange resin or activated carbon, or precipitation with a solvent.

The present invention is illustrated by the following examples but not limited thereto, in which the percentage (percent) is on the weight per volume basis.

EXAMPLE 1

To 500 ml. shaking flask was added in portions a seed culture medium (pH 7.0; 25 ml.) containing sucrose (10%), peptone (2%), potassium phosphate (0.75%), magnesium sulfate·7H$_2$O (0.1%), calcium chloride·2H$_2$O (0.01%), yeast extract (1.0%), adenine (0.02%), guanine (0.02%) and calcium pantothenate (5 mg./l.) and the medium was sterilized. On the medium was inoculated a loopful of Sarcina lutea IAM 1099 and it was subjected to shaking culture at 30° C. for 48 hours (120 r.p.m., Stroke frequency: 8 cm.) to give seed culture.

To 500 ml. shaking flask was added in portions a culture medium (25 ml.) containing sucrose (10%), peptone (2%), potassium phosphate (0.75%), magnesium sulfate·7H$_2$O (0.1%), calcium chloride·2H$_2$O (0.01%), yeast extract (0.5%), adenine (0.02%), guanine (0.02%), calcium pantothenate (5 mg./l.) and thiamine hydrochloride (10 mg./l.) and the medium was sterilized. On the medium was inoculated the seed culture obtained above (0.5 ml.) and it was subjected to shaking culture at 30° C. (120 r.p.m., Stroke frequency: 8 cm.). At 24 hours after initiation of the cultivation sterilized adenine was added so as to be 0.2% in the final concentration, and the cultivation was continued for additional 144 hours, and thereby cAMP was accumulated in an amount of 0.5 mg./ml. of medium.

EXAMPLE 2

In the same manner as described in Example 1, the cultivation was carried out excepting that at 24 hours after initiation of the cultivation sodium $\alpha$-ketobutyrate was added so as to be 1.0% as well as adenine. cAMP was accumulated in an amount of 1.1 mg./ml. of medium.

EXAMPLE 3

In the same manner as described in Example 1, the cultivation was carried out by using purine-requiring mutant of *Sarcina lutea* (FERM–P No. 1333) instead of *Sarcina lutea* IAM 1099. cAMP was accumulated in an amount of 0.8 mg./ml. of medium.

EXAMPLE 4

In the same manner as described in Example 1, the cultivation was carried out by using adenosine deaminase-less mutant of *Sarcina lutea* (FERM–P No. 1334) instead of *Sarcina lutea* IAM 1099. cAMP was accumulated in an amount of 0.85 mg./ml. of medium.

EXAMPLE 5

In the same manner as described in Example 1, the cultivation was carried out by using purine-requiring and adenosine deaminase-less mutant of *Sarcina lutea* (FERM–P No. 766) instead of *Sarcina lutea* IAM 1099, in which sodium pyruvate was added so as to be 1.0% at 24 hours after initiation of the cultivation. cAMP was accumulated in an amount of 2.0 mg./ml. of medium. The supernatant fluid (2.5 liters) of the culture broth thus obtained was passed through a column of ion-exchange resin (Dowex 1 X 2, hydrochloric acid type; made by Dow Chemical Co.). After washing with 0.005 N hydrochloric acid, the adsorbed substance was eluted with 0.05 N hydrochloric acid containing 0.5 M calcium chloride. The initially obtained nucleotide was adsorbed onto activated carbon and then eluted with ethanolic ammonia. The eluate was concentrated and lyophilized to give cAMP 3.6 g.).

EXAMPLE 6

In the same manner as described in Example 1, the cultivation was carried out by using purine-requiring and adenosine deaminase-less mutant of *Sarcina lutea* (FERM–P No. 766) instead of *Sarcina lutea* IAM 1099, in which adenosine instead of adenine as a purine compound was added so as to be 0.2% in the final concentration, and further sodium pyruvate was simultaneously added so as to be 1.0%. cAMP was accumulated in an amount of 1.9 mg./ml. of medium.

EXAMPLE 7

In the same manner as described in Example 1, the cultivation was carried out by using purine-requiring and adenosine deaminase-less mutant of *Sarcina lutea* (FERM–P No. 766) instead of *Sarcina lutea* IAM 1099, in which hypoxanthine instead of adenine as a purine compound was added so as to be 0.2% in the final concentration, and further sodium pyruvate was simultaneously added so as to be 1.0%. cAMP was accumulated in an amount of 1.9 mg./ml. of medium.

What is claimed is:

1. A fermentation process for producing adenosine cyclic 3',5'-phosphate which comprises the steps of inoculating *Sarcina lutea* ATCC 9341, *Sarcina lutea* ATCC 21880, or *Sarcina lutea* ATCC 21881 into a culture medium, cultivating the culture in the presence of a purine compound selected from the group consisting of adenine, guanine, hypoxanthine adenosine or mixtures thereof until adenosine cyclic 3',5'-phosphate is accumulated in the culture broth, and recovering it from the culture broth.

2. The fermentation process according to claim 1, wherein the cultivation is carried out in the presence of a keto acid or its salt.

3. The fermentation process according to claim 1, wherein the cultivation is carried out in an aerobic condition, at a temperature of about 10° to 40° C. and at pH value of about 5 to 9.

4. The fermentation process according to claim 1, wherein the purine compound is added within a period of 48 hours after initiation of the cultivation.

5. The fermentation process according to claim 1, wherein the purine compound is a member selected from the group consisting of adenine, hypoxanthine, adenosine and inosine.

6. The fermentation process according to claim 2, wherein the keto acid or its salt is added within a period of 48 hours after initiation of the cultivation.

7. The fermentation process according to claim 2, wherein the keto acid or its salt is a member selected from the group consisting of pyruvic acid, $\alpha$-ketobutyric acid, $\alpha$-isovaleric acid and the salt thereof.

References Cited
UNITED STATES PATENTS
3,630,842   12/1971   Ishiyama et al. _____ 195—28 N ALVIN E. TANENHOLTZ, Primary Examiner